United States Patent
Hisano (10) Patent No.: US 7,098,790 B2
(45) Date of Patent: Aug. 29, 2006

(54) ELECTRONIC DEVICE ATTACHED TO A PET

(75) Inventor: Atsushi Hisano, San Jose, CA (US)

(73) Assignee: Omron Corporation, Kyoto (JP)

( * ) Notice: Subject to any disclaimer, the term of this patent is extended or adjusted under 35 U.S.C. 154(b) by 151 days.

(21) Appl. No.: 10/626,742

(22) Filed: Jul. 25, 2003

(65) Prior Publication Data

US 2004/0189477 A1 Sep. 30, 2004

Related U.S. Application Data

(60) Provisional application No. 60/458,980, filed on Mar. 28, 2003.

(51) Int. Cl.
*G08B 13/14* (2006.01)
(52) U.S. Cl. .............. 340/568.1; 340/686.4; 340/686.6; 340/573.1; 119/858; 119/859
(58) Field of Classification Search .......... 340/586, 340/686.4, 686.6, 573.3, 573.4, 687, 568, 340/573.1, 568.1; 40/300, 665; 119/858, 119/859
See application file for complete search history.

(56) References Cited

U.S. PATENT DOCUMENTS 5,754,108 A * 5/1998 Ungarsohn ............ 340/568.1

6,668,487 B1 * 12/2003 Vesey ..................... 49/169

FOREIGN PATENT DOCUMENTS

JP 3-289983 A 12/1991
JP 2001-136707 A 5/2001

OTHER PUBLICATIONS

"Tug Power", http://www.nseg.co.jp/japanese/products/tug/syousai.htm, 2 pages.

* cited by examiner

*Primary Examiner*—Tai T. Nguyen
(74) *Attorney, Agent, or Firm*—Foley & Lardner LLP (57) ABSTRACT

When a lead used for taking a pet for a walk or leashing the pet to a place such as a kennel is pulled by the pet or a human during walk or while the pet is leashed, a portable electric power generator connected with the lead generates electricity using mechanical energy obtained by the pulling action. The electricity generated by the portable electric power generator is supplied for the electronic device attached to pet worn by the pet through a charging cable disposed along the lead inside or outside the lead, thereby charging a rechargeable battery inside the electronic device attached to pet. The electronic device attached to pet uses the electrical energy of the integrated battery to perform a predetermined operation (such as wirelessly reporting the current location of the pet, and wirelessly reporting information representing the sound of the pet). The electronic device attached to pet reports that the pet got away from a location where the owner exists and has gotten lost for a number of conditions.

3 Claims, 7 Drawing Sheets

| PARAMETERS FOR OPERATION CONTROL | SIGNIFICANCE OF VALUE, HOW TO DETERMINE VALUE TO BE SET |
|---|---|
| P1: TIME INTERVAL FOR LOCATION MEASURING WITH GPS | INCREASE THE TIME INTERVAL AS THE REMAINING ENERGY AMOUNT OF THE BATTERY DECREASES. THIS SAVES ELECTRIC POWER. |
| P2: REFERENCE TRAVEL AMOUNT FOR INVOKING WIRELESS REPORT | INVOKE WIRELESS REPORT IF THE TRAVEL DISTANCE FROM THE MEASURED LOCATION WIRELESSLY REPORTED LAST TIME EXCEEDS THIS REFERENCE TRAVEL AMOUNT. NOTE THAT THE REFERENCE TRAVEL AMOUNT IS SET SMALLER FOR A TRAVEL TOWARD THE DANGEROUS ZONE. |
| P3: SPEAKER LOUDNESS | IF A SEARCHING PERSON IS NOT PRESENT WITHIN A REFERENCE DISTANCE, THE LOUDNESS IS SET TO ZERO OR THE POWER FOR THE SPEAKER IS TURNED OFF. IF THIS VALUE IS 0, IT INDICATES THE POWER SUPPLY FOR THE SPEAKER IS OFF.<br><br>WHEN THE SEARCHING PERSON IS PRESENT WITHIN THE REFERENCE DISTANCE, THE POWER SUPPLY FOR THE SPEAKER IS SET TO ON, AND THE LOUDNESS IS SET TO A SPECIFIED VALUE. |
| P4: LIGHT EMITTING POWER OF LED | IF A SEARCHING PERSON IS NOT PRESENT WITHIN A REFERENCE DISTANCE, THE LIGHT EMITTING POWER IS SET TO ZERO OR THE POWER SUPPLY FOR THE LED TURNED OFF. IF THIS VALUE IS 0, IT INDICATES THE POWER SUPPLY FOR THE LED IS OFF.<br>IF THE SEARCHING PERSON IS PRESENT WITHIN THE REFERENCE DISTANCE, AND THE AMBIENT BRIGHTNESS IS LESS THAN A REFERENCE VALUE, THE POWER FOR LED IS TURNED ON AND THE LIGHT EMITTING POWER IS SET TO A SPECIFIED VALUE. |
| P5: TYPE OF SOUND GENERATED BY SPEAKER | SELECTS THE TYPE OF THE SOUND WITH THE FREQUENCY AND THE SOUND GENERATION PATTERN EASILY DISTINGUISHABLE FROM THE AMBIENT NOISE. |
| P6: TYPE OF LED LIGHT EMITTING PATTERN | SELECTS THE TYPE HAVING THE WAVELENGTH AND THE LIGHT EMITTING PATTERN EASILY DISTINGUISHABLE FROM THE AMBIENT NOISE LIGHT. |
| P7: WHETHER SOUND DATA FROM MICROPHONE IS TRANSMITTED | 1: TRANSMIT SOUND DATA<br>0: DO NOT TRANSMIT SOUND DATA<br><br>THOUGH IT IS IMPORTANT SINCE IT IS CLUE TO THE SAFETY AND THE WHEREABOUTS OF THE PET, THE TRANSMISSION REQUIRES LARGE ELECTRIC POWER CONSUMPTION, AND IT IS SET TO THE VALUE INDICATING DATA TRANSMISSION WHEN THE BATTERY HAS A SUFFICIENT REMAINING ENERGY AMOUNT. |
| P8: WHETHER SENSING INFORMATION FROM AMBIENT ENVIRONMENT SENSOR IS TRANSMITTED | 1: TRANSMIT SENSING INFORMATION<br>0: DO NOT TRANSMIT SENSING INFORMATION<br><br>THOUGH IT IS IMPORTANT SINCE IT IS CLUE TO THE SAFETY AND THE WHEREABOUTS OF THE PET, THE TRANSMISSION REQUIRES LARGE ELECTRIC POWER CONSUMPTION, AND IT IS SET TO THE VALUE INDICATING DATA TRANSMISSION WHEN THE BATTERY HAS A SUFFICIENT REMAINING ENERGY AMOUNT. | ns
ELECTRONIC DEVICE ATTACHED TO A PET

BACKGROUND OF THE INVENTION

1. Field of the Invention

The present invention relates to an electric power generation system for charging a battery integrated into an electronic device attached to pet worn by a pet, and a pet tracking system for searching for a stray pet.

2. Description of the Prior Art

In Japanese Patent Registration No. 3289983, a search terminal is designed such that it can be installed on a collar for a pet, and a stray pet can always carry it. The search terminal includes a receiver for selective call function, a sound generating apparatus, a speaker, and a receiving antenna. The sound generating apparatus is constituted so as to include a speech synthesis circuit, for example, and since a digitized sound signal is memorized in a memory in the circuit, the speaker supplies a sound message based on a paging detecting signal. An example of the content of the sound message may be "This dog (cat) has gotten lost, and the owner is looking for it. If you notice this dog, please take it under your protection, and call the phone number written on the collar". When a pet wearing a collar of this type has gotten lost, a number assigned to the search terminal is called in the same way as using a telephone to page a standard beeper. Since a massage similar to the one described above is provided as sound from the search terminal installed on the collar when a transmitting facility pages the search terminal, a person close to the stray pet can know that the dog or the cat is a pet which the owner is searching for, and can call the phone number written on the collar or included in the message so as to report the whereabouts of the pet to the owner after taking the pet under protection. A battery for supplying individual blocks of the search terminal with electric power is integrated into the search terminal, or is fixed to a proper position on the collar.

Also there is an electronic device attached to pet which incorporates a battery, a wireless transmitter, a microphone, and the like, is attached to a collar of a dog, obtains bowwow of the dog through the integrated microphone, analyzes the bowwow, and wirelessly transmits a message of analysis result to the outside.

The following Web page shows a portable manual compact electric power generator referred to as Tug-Power as a tool for charging a battery of a cellular phone at any time and at any place.

http://www.nseg.co.jp/japanese/products/tug/syousai.htm

A similar apparatus is disclosed in Japanese Patent Laid-Open Publication No. 2001-136707.

PROBLEMS OF PRIOR ART

A battery is used for operating an electronic device attached to pet worn by a pet in Japanese Patent Registration No. 3289983, and other prior art. To replace the battery of the electronic device attached to pet, it is necessary to perform an operation including opening a battery container cover of the electronic device attached to pet, taking out an old battery, installing a new battery, and closing the battery container cover while the pet is kept unmoved. This operation takes a large amount of labor and time since the pet tries to move around, and the pet tends to put the battery into its mouse. When the battery is charged, if the battery integrated into the electronic device attached to pet is charged while the pet is wearing the electronic device attached to pet, it is necessary to route a power supply cord closely to the pet. A pet is seldom kept in an environment allowing such operation, or even if the pet is kept in the environment allowing such operation, the pet bites the power supply cord or moves to disconnect the power supply cord from the electronic device attached to pet. It is very time and labor consuming to manage the pet so as not to cause such troubles until the charging completes. There is such a method that the electronic device attached to pet is removed from a pet, it is brought to a place away from the pet, the battery is replaced or charged, and the electronic device attached to pet is put back on the pet on completion. With this method, putting the electronic device attached to pet on the pet may be neglected, or the electronic device attached to pet may be lost. With the conventional systems requiring replacement of the battery, time and labor consuming charging operation, or operation after detaching the electronic device attached to pet, if a pet suddenly goes away from a location of the owner, and gets lost, the battery power may be deficient or the electronic device attached to pet may not be worn, and this search device may become useless. In addition, when a person wants to converse with a pet, the electrical energy amount remaining in the battery (referred to as remaining energy amount hereafter) integrated into the electronic device attached to pet may be deficient, and the object may not be attained. "Collar pullout" is a major cause for a pet escaping from its owner and getting lost. When a pet pulls a lead while it is wearing a collar, the collar is completely pulled out from the neck of the pet, resulting in this collar pullout. Since the collar is pulled out, even if it is intended to install the electronic device attached to pet on the collar and to track the pet, the device would be useless.

SUMMARY OF THE INVENTION

In view of the problems of the prior art, the objects of the present invention are set as follows.

(1) In everyday life activities such as after putting a lead (a rope and a chain are correctively referred to as a lead hereafter) on a pet, taking it for a walk, and leashing it to a kennel, the battery integrated into the electronic device attached to pet worn by the pet is automatically charged.

(2) When a pet gets away from the location of its owner, and gets lost, before the energy amount remaining in the battery integrated into the electronic device attached to pet becomes lower than a predetermined value, a function of the electronic device attached to pet is used to search and locate the stray pet as soon as possible.

(3) Even when the collar pullout from the pet occurs, the tracking the pet is not obstructed.

When a lead used for taking a pet for a walk or leashing the pet to a place such a kennel is pulled by the pet or a human during walk or while the pet is leashed, a portable generator connected with the lead converts mechanical energy obtained by the pulling action into electrical energy. Namely, electric power generation is conducted. The electricity generated by the portable electric power generator is supplied for the electronic device attached to pet worn by the pet through a charging cable disposed along the lead inside or outside the lead, thereby charging a rechargeable battery inside the electronic device attached to pet. The electronic device attached to pet uses the electric energy of the integrated rechargeable battery to perform a predetermined operation (such as wirelessly reporting the current location of the pet, and wirelessly reporting information indicating the sound of the pet). The electronic device attached to pet reports that the pet got away from a location where the owner exists, and has gotten lost in a case where any one of the following conditions:

Case 1: a collar of the pet is pulled out,

Case 2: a locating apparatus integrated into the electronic device attached to pet detects a location separated from a registered location by a predetermined distance, and the rechargeable battery has not been charged for more than a predetermined period, and Case 3: the pet has been staying still in a dangerous zone for more than a predetermined period, is met, for example.

When the pet gets lost, though it is important to quickly transmit a report including the current location of the pet to concerned persons, setting for the frequency of the report and the condition of the report is wirelessly changed so that the remaining energy of the battery integrated into the electronic device attached to pet is efficiently used according to the remaining energy amount. Also, the electronic device attached to pet is wirelessly set such that guide sound is released or guide light is generated so that the stray pet is found easily when a searching person comes immediately close to the stray pet.

As a measure for preventing pullout of a collar, which is a major cause for a stray pet, a collar for pulling to which a lead is attached, and a collar for displaying or transmitting information useful for searching for a stray pet are independently attached. Then, the collar for pulling is attached closer to the ears of the pet, and the collar for information is attached farther from the ears of the pet. Since the collar for information remains even if the collar for pulling is pulled out in this way, the collar for information is still available when the pet gets lost. The electronic device attached to pet is mounted on the collar for information.

BRIEF DESCRIPTION OF THE DRAWINGS

FIG. 6 describes a determination criteria whether a pet is get lost and a status when a pet is searched for; and FIG. 7 is a table describing operation control parameters for the electronic device attached to pet.

DESCRIPTION OF THE PREFERRED EMBODIMENTS

Figure 1:
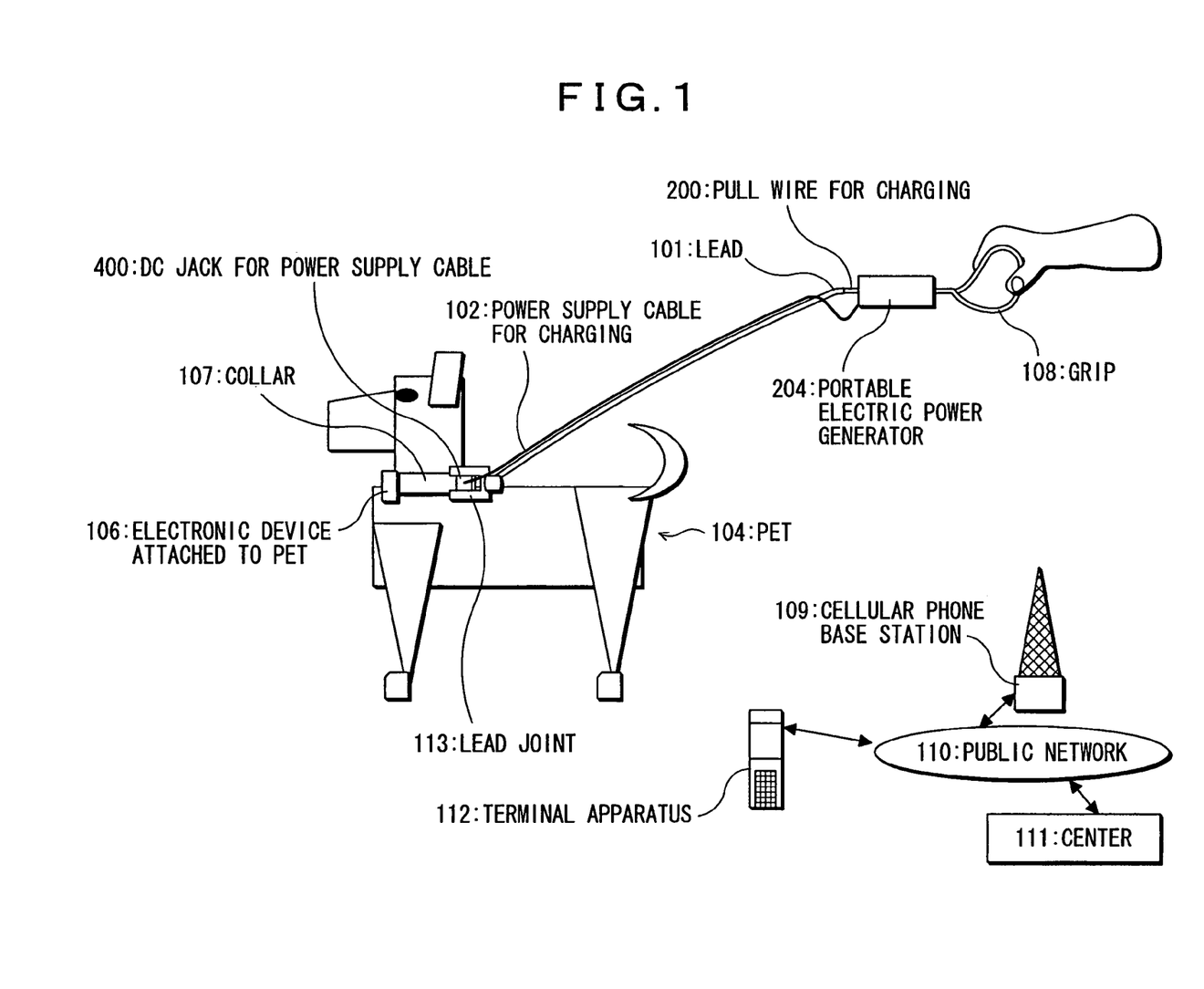
FIG. 1 is a conceptual drawing of a system.

The entire system is described based on FIG. 1. A collar 107 is attached to a pet 104 (a dog is shown). A harness wound on and fixed to the body and the neck of a pet may be used in place of a collar. When the harness is used, though a problem such as collar pullout does not occur, it may be bothering to attach it to a pet, and the pet may dislike wearing it. A lead joint 113 for connecting a lead 101 for pulling a pet during walk is mounted on the collar 107. Also, an electronic device attached to pet 106 is fixed to the collar 107 by screwing for preventing it from being detached when the pet scratches the collar 107 with the foot or someone tries to pull it so as to detach it. The other end of the lead 101 is detachably connected to the lead joint 113 on the collar 107. A portable electric power generator 204 is connected to the lead 101 through a pull wire for charging 200. A power supply cable for charging 102 comes out from the portable electric power generator 204, and is routed along the lead 101. When the pull wire for charging 200 is pulled, a part wound inside the portable electric power generator 204 comes out while the portable electric power generator 204 is generating electricity. Since the wire 200 extending outside from the portable electric power generator 204 becomes longer as a result, the power supply cable for charging 102 provided in parallel with the wire 200 has to have a slack with a predetermined length. The power supply cable for charging 102 branches from the lead 101 after routing along the outside or the inside of the lead 101, and reaching a neighborhood of the lead joint 113, and is connected with a DC jack for power supply cable 400 by way of an unillustrated DC plug or the like formed at the end of the power supply cable for charging 102. A grip 108 in a loop shape for a convenience of human hand gripping is provided on the other end of the portable electric power generator 204.

When a person is walking with the pet 104 while gripping the grip 108, since the pet starts and stops walking and changes the direction, a tensile force is applied to or disappears from the lead 101. When the grip 108 is held by the human hand or bound on a certain place, the portable electric power generator 204 generates electricity each time when the tensile force is applied to or disappears from the lead 101. The generated electrical energy is supplied for the electronic device attached to pet 106 through the power supply cable for charging 102, the unillustrated DC plug disposed on the power supply cable 102, and the DC jack for power supply cable 400 in this order, and then, through an unillustrated cable disposed inside the collar 107. Then, it charges the rechargeable battery in the electronic device attached to pet 106.

When the pet 104 gets lost while wearing the collar 107 with the electronic device attached to pet 106, the electronic device attached to pet 106 conducts (1) detecting the occurrence of the stray pet, (2) wirelessly reporting information on the occurrence of the stray pet, (3) reacting so as to be searched, and (4) controlling the operation according to the remaining battery capacity according to operation control parameters shown in FIG. 7. The stray pet occurrence information may be wirelessly reported by transmitting a message addressed to a predetermined a terminal apparatus 112 through a cellular phone base station 109 and a public network 110, by reporting the message to a center 111 offering stray pet search service again through the cellular phone base station 109 and the public network 110, or by simultaneously conducting both of them.

When the stray pet occurrence information is reported, persons concerned start searching for the stray pet. Respective proper reactions are necessary for the search according to the situation. The electronic device attached to pet 106 controls the operation such as reacting to be searched and controlling the operation according to the remaining battery capacity based on the reaction of remotely setting the proper operation control parameters to the electronic device attached to pet 106.

Referring to other drawings, more detailed description is provided.

[Transition of Remaining Energy Amount of Battery]

Figure 5A:
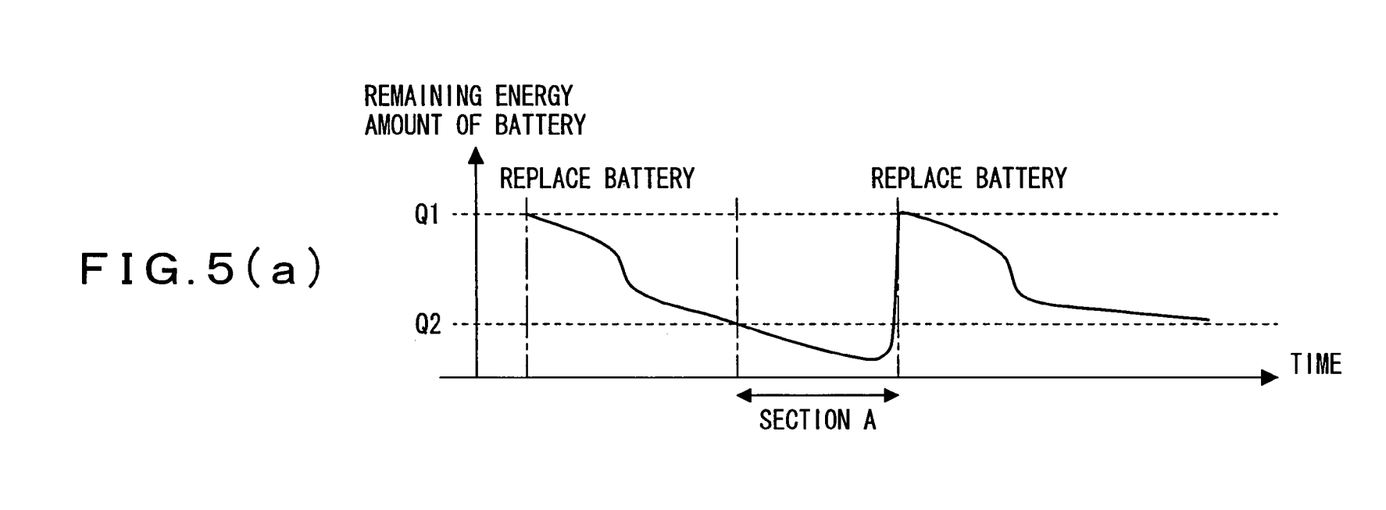
FIG. 5(a) is a conceptual drawing showing a change in remaining energy amount of a battery when a portable electric power generator is not used, and an electronic device attached to pet is used while replacing an integrated battery.
Figure 5B:
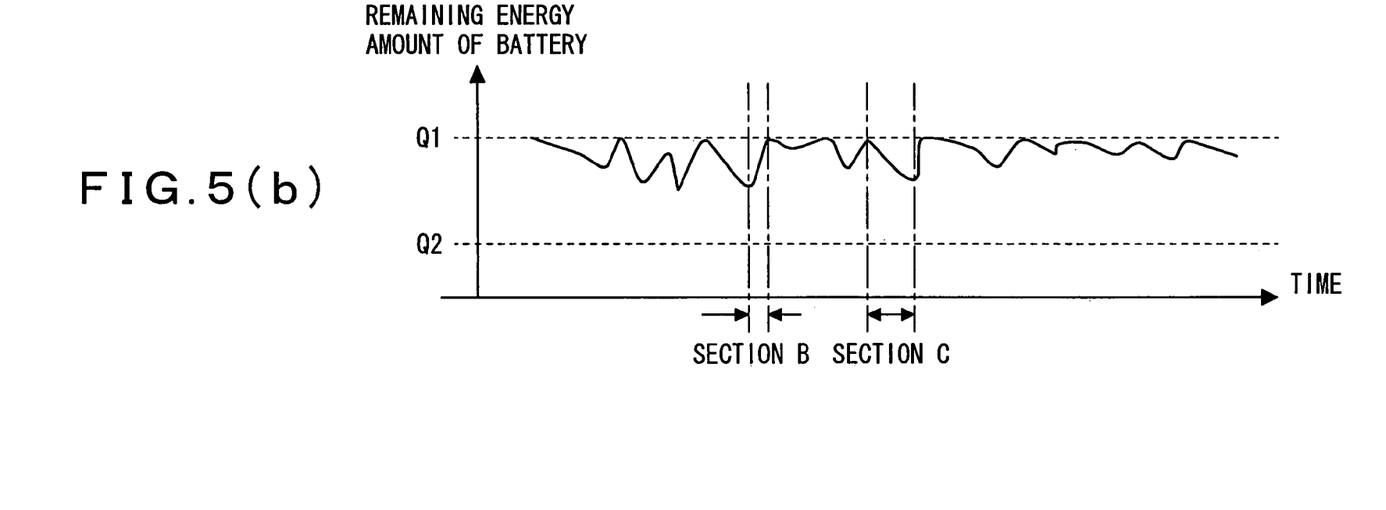
FIG. 5(b) is a conceptual drawing showing a change in remaining energy amount of a battery when a system of the present invention is used.

Referring to FIG. 5(*a*) and FIG. 5(*b*), the difference in the remaining energy amount of the battery contained in the electronic device attached to pet 106 between a case where the portable electric power generator 204 charges, and a non-rechargeable battery is incorporated. FIG. 5(*a*) is a conceptual drawing showing the transition of the remaining energy amount of the battery in the prior art disclosed in Japanese Patent Registration No. 3289983.

In FIG. 5(*a*), the remaining energy amount of the battery is at the maximum (Q1 level shown in the drawing) immediately after the non-rechargeable battery is replaced, and the remaining energy amount simply decreases until the battery is replaced next time. It is necessary to always maintain the power of the electronic device attached to pet 106 to on if the electronic device attached to pet 106 is used to search for a pet when the pet gets lost. This is that the pet may always get lost, and the electronic device attached to pet 106 must stand by so as to automatically detect the stray state and to report it once the pet gets lost. Thus, the electronic device attached to pet 106 always consumes standby electric power, and the remaining energy amount of the battery decreases as time elapses. In addition, for example, when the electronic device attached to pet 106 wirelessly transmits a certain message, the remaining energy amount decreases more than it does in the standby state. When the remaining energy amount of the battery decreases less than Q2, it is probable that the remaining energy amount becomes almost zero before the pet search is successfully completed, even though using the electronic device attached to pet 106 is tried. Thus, when the pet gets lost in a section A in FIG. 5(*a*), the search for the pet becomes difficult.

FIG. 5(*b*) shows a case where the system of the present invention is used, and is a conceptual drawing of the transition of the battery remaining energy amount when the lead 101 with the portable electric power generator 204 is used to take the pet for a walk or leash the pet to a certain place. When the pet is stationary even if the pet is leashed to a certain place with the lead 101, or when the pet is unleashed, and stays in a room, for example, the remaining energy amount decreases. This is that the electronic device attached to pet is in the standby state, and consumes the standby electric power in case that the pet gets lost. However, in an ordinary pet keeping, the pet is taken for walk while leashed to the lead everyday or every few days. During the walk, the lead is often pulled. Also, the pet moves around and pulls the lead while it is leashed to a certain place. A section B in FIG. 5(*b*) shows that the pet goes for a walk while the lead 101 with the portable electric power generator 204 is used, and consequently, the remaining energy amount of the battery recovers rapidly. A section C shows a case where the electronic device attached to pet 106 consumes electric power by conducting wireless report or the like. As FIG. 5(*b*) shows, with the system of the present invention, since the remaining energy amount of the battery does not decrease below the level of Q2, sufficient energy required by the electronic device attached to pet 106 for the search remains at any time when the pet gets lost and the search becomes necessary.

[Portable Electric Power Generator]

Figure 2:
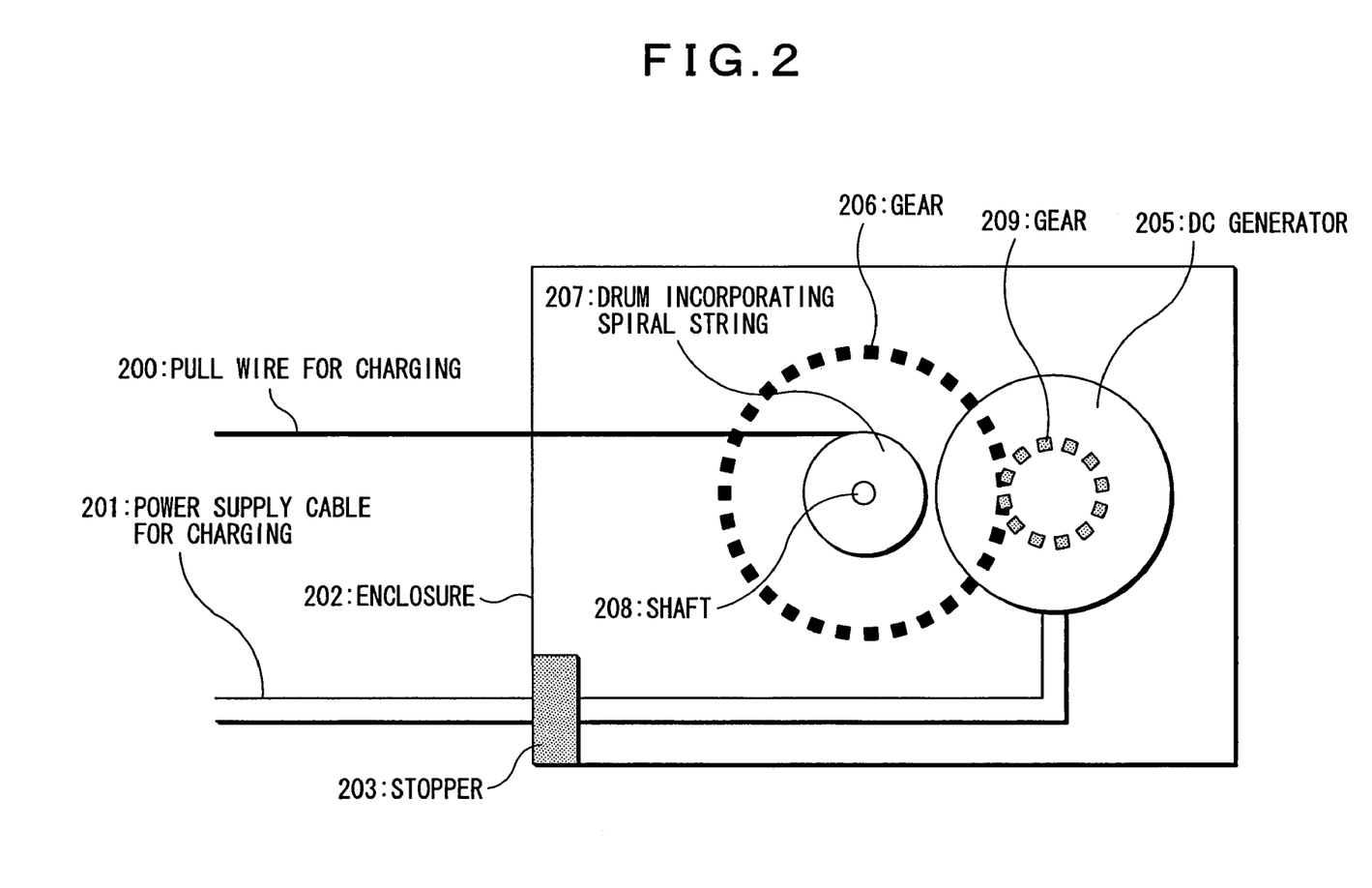
FIG. 2 is a structural drawing of a portable electric power generator attached to a lead for a pet.

FIG. 2 shows the structure of the portable electric power generator 204. A drum incorporating spiral spring 207 is installed rotatably about a shaft 208 fixed to an enclosure 202. One end of an unillustrated spiral spring in the drum 207 is fixed to the shaft 208, and the other end is fixed to the inner wall of the drum 207. A strong string is wound around the drum 207. One end of the string is fixed to the outer wall surface of the drum 207, and the other end of the string is connected to the pull wire for charging 200. When the pull wire for charging 200 is pulled, the string wound on the drum is pulled. Consequently, the drum 207 rotates while it deforms the spiral spring in it such that the spring is squeezed toward the center. When the drum 207 rotates, a gear 206 attached to the drum 207 rotates, and a gear 209 meshed with this gear 206 rotates so as to rotate a rotation shaft of a rotor of a DC generator 205, thereby generating electricity. When the tensile force applied to the pull wire for charging 200 disappears, the wound-out string is automatically wound on the drum by the restoring force of the spiral spring attached to the inside of the drum, and simultaneously, the pull wire for charging 200 is pulled inside the portable electric power generator 204. The electricity from the DC generator 205 is supplied on a power supply cable for charging 201 connected to the outside through a stopper 203. As a portable electric power generator 204, one disclosed in Japanese Patent Laid-Open Publication No. 2001-136707 may be used.

[Constitution and Basic Operation of Electric Device Attached to Pet]

Figure 3:
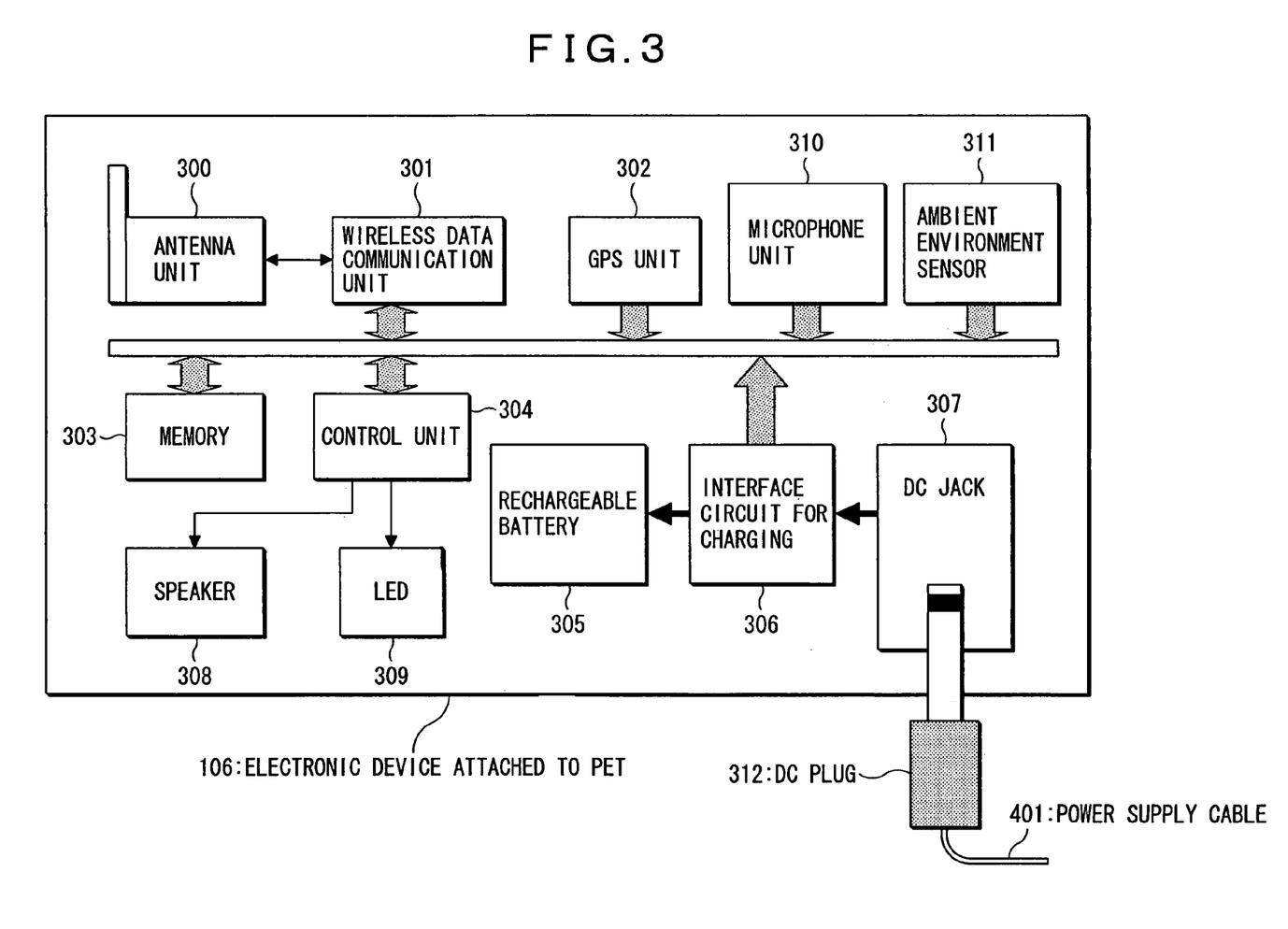
FIG. 3 is a block diagram of an electronic device attached to pet installed on a collar or the like of a pet.

Based on FIG. 3, description is provided for the electronic device attached to pet 106. The basic functions of the electronic device attached to pet 106 are realized by an antenna unit 300, a wireless data communication unit 301, a GPS unit 302, a memory 303, a control unit 304, a rechargeable battery 305, an interface circuit for charging 306, and a DC jack 307. The basic functions include (1) using the interface circuit for charging 306 to regulate the electricity received by the DC jack 307 to a constant voltage, thereby charging the rechargeable battery 305, and (2) using the electrical energy of the rechargeable battery 305 to drive the GPS unit, measuring the current location of the electronic device attached to pet 106, and making the wireless data communication unit use the antenna unit 300 to transmit information including the current location to a predetermined destination. It is desirable to include information corresponding to the remaining energy amount of the rechargeable battery into the information wirelessly transmitted. This is that the information from the electronic device attached to pet 106 is useful for the receiving party to prepare a plan for searching for the stray pet, and to determine what control to be performed in terms of the operation control items described later considering the remaining energy amount. For executing the basic functions, information processing conducted by the control unit 304 while it is using the memory 303 is indispensable. The control unit 304 is realized by a one chip microcomputer, for example. Since the most important information is the current location of the pet when the pet gets lost, the basic functions (1) and (2) described above are functions primarily required for the electronic device attached to pet 106.

If the wireless data communication unit 301 uses the antenna unit to wirelessly transmit sound and other sensing information obtained by a microphone unit 310 and an ambient environment sensor 311 to a predetermined destination, the information is useful to narrow down the location of the stray pet when the location measuring by the GPS unit 302 is not available due to the ambient environment or the like. A speaker 308 and an LED 309 are used to generate guide sound or guide light for guiding a person searching for a stray pet to the location of the stray pet when the searching person comes immediately close to the stray pet.

Also, the control unit 304 uses the antenna unit 300 and the wireless data communication unit 301 to receive the operation control parameters from the outside, memorizes them into the memory 303, and uses them for the operation control of the electronic device attached to pet 106. The operation control parameters include those shown in FIG. 7.

[Measure Against Collar Pullout and Detecting Collar Pullout]

In the system shown in FIG. 1, both the electronic device attached to pet 106 and the lead 101 are installed on the single collar 107. Therefore, when the lead 101 is fixed to something, if the pet 104 pulls the lead 101 while wearing the collar 107 on the neck, the collar 107 is pulled out from the neck, and the electronic device attached to pet 106 is left on the collar 107 not worn by the pet. If this is the case, using the electronic device attached to pet 106 for finding the location of a stray pet as a function of it is not attained at all.

Figure 4:
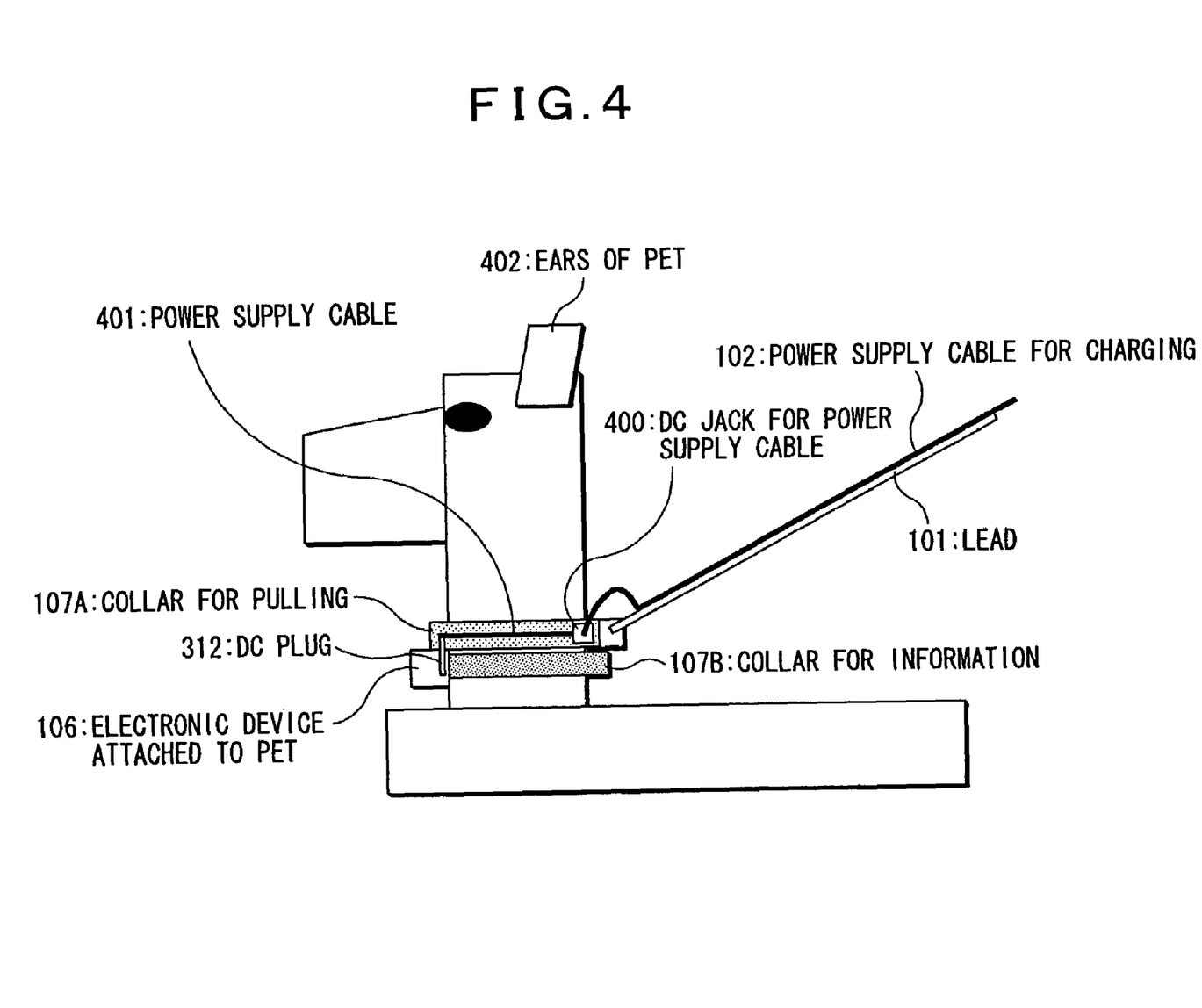
FIG. 4 describes how to attach a collar for pulling and a collar for information for preventing collar pullout.

A structure shown in FIG. 4 is used as a counter measure against the collar pullout which is a serious situation.

As collars, two of a collar for pulling 107A and a collar for information 107B are prepared, and the two collars are attached to the neck of a pet such that the collar for pulling 107A is above (closer to the ears of the pet) the collar for information 107B.

The collar for pulling 107A is connected with the lead 101, and is then used for pulling the pet.

A device (such as a metal plate, a name tag, and cloth) on which information useful for reporting a pet to persons concerned with the pet (such as the registration number of the pet, the contact of the pet owner, and the name of the pet) when the pet gets lost is shown, engraved, printed, or embroidered, and/or a device for wirelessly transmitting the status information of the pet (such as the location, the ambient environment, the health of the pet, and the sound generated by the pet) is installed on the collar for information.

When two of the collar for pulling 107A, and the collar for information 107B are prepared, and the two of the collars are attached on the neck of a pet such that the collar for pulling 107A is above (closer to the ears of the pet) the collar for the information 107B, even when the upper collar for pulling 107A is pulled out, since the lower collar for information 107B remains while it is attached on the neck of the pet, the collar for information 107B is useful for the persons concerned with the pet (such as the owner) to obtain information on the pet, and it is expected that the probability of finding the pet increases if the pet gets lost.

When existence detecting means for detecting the existence of the collar for pulling 107A is provided in the electronic device attached to pet 106 installed on the collar for information 107B, the pullout of the collar for pulling 107A is detected when the existence detecting means detects the absence of the collar for pulling 107A. The type of the existence detecting means may vary. For example, a thin metal wire may be embedded in the bottom surface of the collar for pulling 107A, namely, the surface in contact with the collar for information 107B, and the electronic device attached to pet 106 may have a function of a proximity sensor for detecting the existence of the metal wire. If the metal wire is not detected, it can be determined that the collar for pulling 107A does not exist any more. As another method, a small pin protruding downward from the collar for pulling 107A is provided, and the pin is inserted into a hole incorporating a switch of the electronic device attached to pet 106. When the switch turns off, the electronic device attached to pet 106 can determines that the collar for pulling 107A is lost.

The structure shown in FIG. 4 can use the electricity generated by using the energy obtained when a pet pulls the lead 101 to charge the rechargeable battery 305 integrated into the electronic device attached to pet 106 in addition to including the system for detecting the collar pullout described above.

The lead 101 is detachably attached to the collar for pulling 107A. The power supply cable for charging 102 is disposed along the lead 101, and a DC plug is formed at the end of the power supply cable for charging on the side of the collar, and can be inserted into and pulled out from the DC jack for power supply cable 400 disposed on the surface of the collar for pulling 107A. A mechanism for preventing the inserted DC plug from being pulled out with a force lower than a certain degree is provided inside the DC jack for power supply cable 400. In the collar for pulling 107A, a power supply cable 401 runs from the DC jack for power supply cable 400 to the DC plug 312. The DC plug 312 is firmly attached to the collar for pulling 107A. The electronic device attached to pet 106 is firmly installed on the collar for information 107B. An opening of the DC jack 307 integrated into the electronic device attached to pet 106 faces upward, and is displaced at an exact position for inserting the DC plug 312 into the DC jack 307. Thus, the collar for pulling 107A and the collar for information 107B are connected electrically and mechanically with each other by inserting the DC plug of the collar for pulling 107A downwardly into the DC jack of the electronic device attached to pet 106. As a result, the rechargeable battery integrated into the electric device attached to pet 106 is charged by the electricity supplied through the lead 101. Also, the interface circuit for charging 306 of the electronic device attached to pet 106 detects whether the DC plug 312 is inserted into the DC jack 307, reports the detection result to the control unit, and simultaneously, transmits a signal corresponding to the remaining energy amount of the rechargeable battery to the control unit.

The DC plug 312 is pulled out from the DC jack 307 when it is pulled by a force more than a predetermined value. Thus, when the collar for pulling 107A on which the DC plug 312 is firmly installed is pulled out from the neck of a pet, the DC plug 312 is pulled out from the DC jack 307, and the collar for information 107B remains on the neck.

The interface circuit for charging 306 of the electronic device attached to pet 106 installed on the collar for information 107B detects that DC plug 312 is pulled out from the DC jack 307, and then, transmits an interrupt signal indicating the collar pullout to the control unit 304. As a result, the control unit 304 detects the collar pullout.

[Stray Status Occurrence Detection]

The operation of searching for a stray pet starts from "stray status occurrence detection" by the electronic device attached to pet 106. However, even when the electronic device attached to pet 106 does not detect the stray status occurrence, a concerned person who recognizes a stray status of a pet may wirelessly transmit a set of the operation control parameters shown in FIG. 7 to the electronic device attached to pet 106 so as to react against the occurrence of stray status.

When any one of the following cases is met, the electronic device attached to pet 106 detects the stray status occurrence. Since the system shown in FIG. 1 is not prepared for the collar pullout, it cannot detect a case 1, and detects only a case 2 and a case 3. However, if the part of the collar in the system in FIG. 1 is changed to that in FIG. 4, the system can detects all of the case 1 to case 3.

Case 1: a collar of the pet is pulled out

Figure 6:
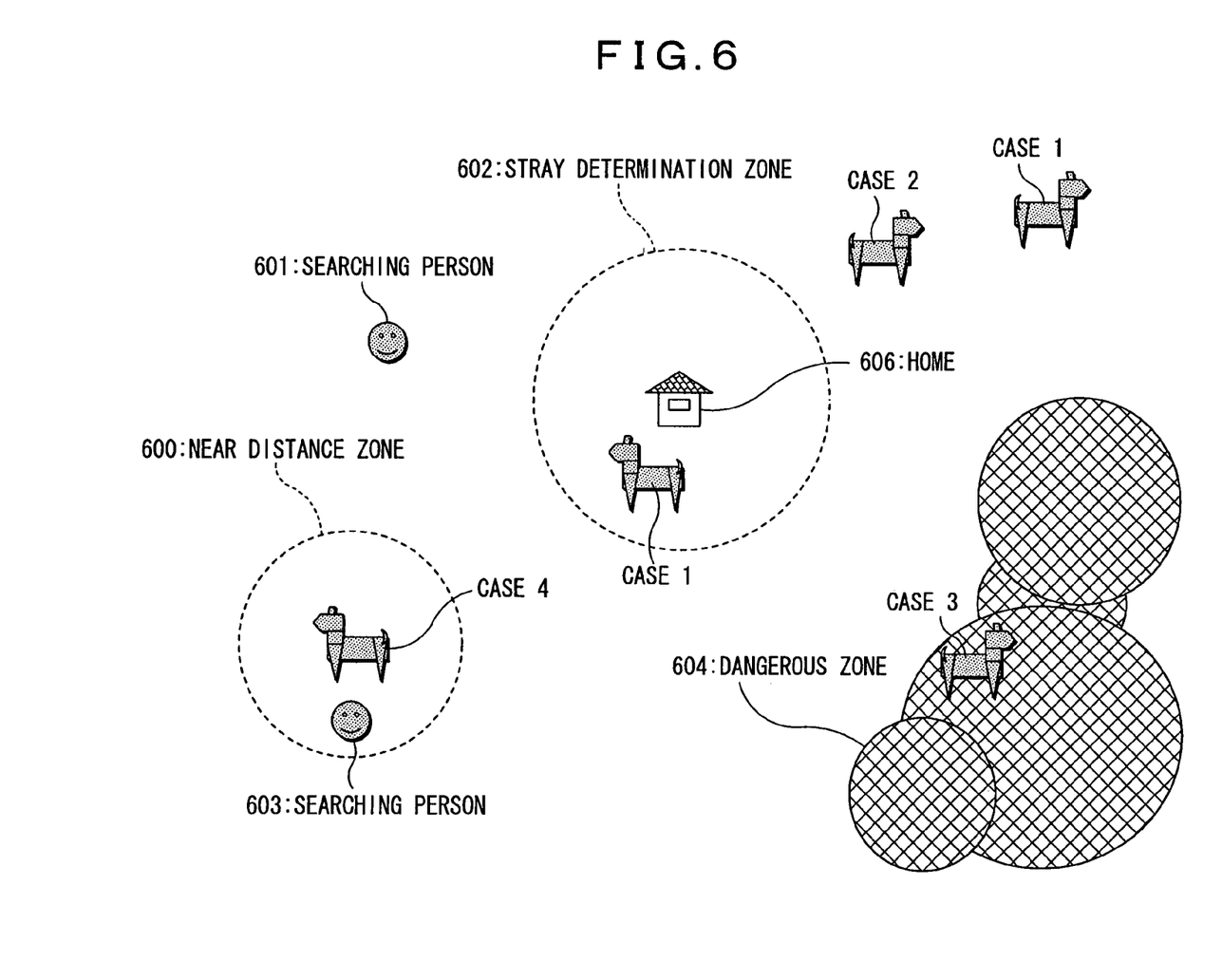

Case 2: a locating apparatus (such as a GPS receiver) integrated into the electronic device attached to pet detects a location separated from a registered location (such as home or a kennel) by a predetermined distance, and the rechargeable battery 305 has not been charged for more than a predetermined period Case 3: the pet has been staying still in a dangerous zone for more than a predetermined period FIG. 6 shows two cases where the collar pullout occurs in the home garden and during walk away from the home as the case 1. The collar pullout detection method for detecting that the collar of the pet is pulled out in the case 1 has already been described in [Measure against collar pullout and detecting collar pullout]. Thus, referring to FIG. 6, the cases 2 and 3 are described in more detail here.

The case 2 is used to prevent recognizing a status where a lead is not attached to a pet and the pet is unleashed at home or in the home garden as a stray status occurrence, and to recognize a status where the lead 101 is not connected to the collar at a location away from home (outside a stray determination zone 602) for more than predetermined period as a stray status. For that purpose, the location of home 606 and a radius of the stray determination zone are registered to the electronic device attached to pet 106 in advance. There are many ways for the registration, and the following method is one of them. A portable terminal 112 in FIG. 1 is used to transmit information of the address or the latitude and longitude of the home, the radius of the stray determination zone, and the phone number assigned to the subject electronic device attached to pet to the center 111. The center 111 uses wireless data transmission to call the electronic device attached to pet 106 through the public network 110 and the cellular phone base station 109, and transmits the latitude and longitude of the home, and the radius of the stray determination zone. The electronic device attached to pet 106 memorizes the latitude and longitude of the home, and the radius of the stray determination zone received in this way. After the data required for determining the stray status are prepared in this way, the electronic device attached to pet 106 checks whether the current location obtained from the GPS unit 302 is within the stray determination zone 602 with the registered home 606 at its center at a time interval indicated by a parameter P1 shown in FIG. 7. If it is detected that the device is located outside the stray determination zone 602, the device uses the interface circuit for charging 306 to monitor whether the remaining energy amount of the rechargeable battery 305 increases, and the distance between the current location and the registered home 606 after that time T1. If the remaining energy amount of the rechargeable battery 305 continuously decreases from T1 to T2, which is the time after ΔT has elapsed, the stray status is determined. It can be determined that charging is not conducted for a long period indicates that the lead 101 is not connected with the collar of the pet. However, it is determined that the stray status is not present if the remaining energy amount increases, or the current location detected by the GPS unit 302 enters within the stray determination zone 602 with the home 606 at its center even once from the time T1 to the time T2.

The case 3 assumes detecting a case where the pet involves in an accident in a dangerous zone 604, is injured or dead, and cannot move. The dangerous zone 604 is registered as a combination of multiple circles in advance. The method for registering the individual circles is the same as the method for registering the stray determination zone 602 with the home as its center. The stray status is determined when the location detected by the GPS unit 302 remains for more than a predetermined period, and stays in this dangerous zone.

[Operation in Stray Status]

Referring to FIG. 1 and FIG. 6, description is provided.

Phase 1:

Immediately after the electronic device attached to pet 106 detects the stray status, the electronic device attached to pet 106 uses the wireless data communication unit 301 to wirelessly transmit the location information detected by the GPS unit 302, the remaining energy amount detected by the interface circuit for charging 306, identification information of the pet, and information on the current time along with a code or a message indicating that the stray status is present to a predetermined destination. Then, the procedure moves to a phase 2. The predetermined destination may be the terminal apparatus 112 in FIG. 1, the center 111, or both of them.

When the center 111 receives the abovementioned report indicating the stray status transmitted from the electronic device attached to pet 106, it reads out image data recording the appearance of the pet, and the characteristics (the type, the size, the color of the hair, and contact of the owner) of the pet based on the identification information of the pet from a database. Then, the center 111 automatically transmits an electronic mail with attached message indicating that the pet is searched for, and cooperation with the search is appreciated to a public health center, pet shops, and other owners of pets close to the location where the pet got lost. Further, the center 111 automatically posts information the same as the content transmitted with this electronic mail to an electronic bulletin board related to pet search. As a result, the request for searching the pet is asked to a large number of people at an early stage of the stray status of the pet, and the possibility of finding the pet increases. Further, when the center 111 transmits an appearance image of the pet as an image of a detection subject to a network system of surveillance cameras surveying outdoors, information on the location and the time of pets having an appearance similar to the appearance of the pet is automatically obtained. In addition, when the search for the pet is completed, the center 111 transmits the note of the completion of the search to the destinations to which information for the search was transmitted.

Phase 2:

Then, the operation control parameters shown in FIG. 7 are set to defaults. The defaults for P3, P4, P7, and P8 are 0. The electronic device attached to pet 106 wirelessly reports the location information detected by the GPS unit 302, the remaining energy amount detected by the interface circuit for charging 306, the name of the pet, the information on the current time along with the code or the message indicating that the stray status is present to a predetermined destination at the interval of P1 or each time after traveling a distance of P2 according to the values of the operation control parameters while monitoring the incoming instruction of setting the operation control parameters through the wireless data communication unit 301.

When a searching person starts searching on the stage of the phase 1 or the phase 2, the procedure moves to the phase 3.

Phase 3:

The relationship between the stray pet and the searching person becomes the positional relationship between the searching person 601 and the pet in a case 4, the searching person knows the location and the status of the pet, and wirelessly transmits the setting instruction of the operation control parameters for protecting the pet soon while keeping the operation control parameters P3 and P4 to zero so as to prevent the consumption of the battery. In this way, when the positional relationship between the searching person and the pet becomes that between the searching person 603 and the pet in the case 4 where the searching person enters in a near distance zone 600, the procedure moves to a phase 4.

Phase 4:

In the phase 4, the searching person is so close to the pet that the searching person can see the pet with the naked eye, and can detect the guide sound and the guide light generated by the electronic device attached to pet 106. Thus, the searching person properly sets the operation control parameters P3, P4, P5, and P6, and also uses the guide sound and the guide light to search for the pet. When the pet is found, the search ends. The search also ends when the search is given up for some reason. When the search ends, the end of the search is reported through the terminal apparatus 112 to the destination to which the information on the stray status of the pet was transmitted, and the destination to which the search request was transmitted.

What is claimed is:

1. An electronic device attached to a pet comprising:
   detecting means, which is associated with a first collar attached to a neck of the pet for detecting the existence of a second collar which is attached to the neck of the pet;
   storing means for storing a procedure which is invoked on detecting an absence of the second collar by said detecting means;
   a power supply unit; and
   a joint for connecting the power supply unit to the first collar.

2. An electronic device according to claim 1, wherein said electronic device is attached to an outside surface of the first collar.

3. An electronic device attached to a pet comprising:
   a detector, which is associated with a first collar attached to a neck of the pet for detecting the existence of a second collar which is attached to the neck of the pet;
   memory for storing a procedure which is invoked on detecting an absence of the second collar by said detector;
   a power supply unit;
   a joint for connecting the power supply unit to the first collar; and
   wherein said electronic device is attached to an outside surface of the first collar.

\* \* \* \* \*